United States Patent
Zhang et al.

(10) Patent No.: US 12,506,580 B2
(45) Date of Patent: Dec. 23, 2025

(54) METHOD AND APPARATUS FOR FREQUENCY HOPPING FOR CONTROL CHANNELS FOR DEVICES WITH REDUCED CAPABILITIES

(71) Applicant: LENOVO (BEIJING) LIMITED, Beijing (CN)

(72) Inventors: Yuantao Zhang, Beijing (CN); Yingying Li, Beijing (CN); Hongmei Liu, Beijing (CN); Zhi Yan, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 432 days.

(21) Appl. No.: 18/040,688

(22) PCT Filed: Aug. 6, 2020

(86) PCT No.: PCT/CN2020/107438
§ 371 (c)(1),
(2) Date: Feb. 6, 2023

(87) PCT Pub. No.: WO2022/027450
PCT Pub. Date: Feb. 10, 2022

(65) Prior Publication Data
US 2023/0283438 A1 Sep. 7, 2023

(51) Int. Cl.
*H04L 5/00* (2006.01)
(52) U.S. Cl.
CPC .......... *H04L 5/0053* (2013.01); *H04L 5/0007* (2013.01); *H04L 5/0016* (2013.01); *H04L 5/0048* (2013.01)

(58) Field of Classification Search
CPC ... H04L 5/0053; H04L 5/0007; H04L 5/0016; H04L 5/0048
See application file for complete search history.

(56) References Cited

U.S. PATENT DOCUMENTS

| 2019/0208479 | A1 | 7/2019 | Kim et al. | |
| 2020/0314881 | A1* | 10/2020 | Bagheri | H04L 5/0051 |
| 2021/0345342 | A1* | 11/2021 | Sakhnini | H04L 5/0094 |

FOREIGN PATENT DOCUMENTS

| CN | 110612765 A | 12/2019 |
| CN | 110719631 A | 1/2020 |

(Continued)

OTHER PUBLICATIONS

Patent Cooperation Treaty (PCT) International Application No. PCT/CN2020/107438, International Search Report and Written Opinion, Apr. 30, 2021.

(Continued)

*Primary Examiner* — Duc C Ho
(74) *Attorney, Agent, or Firm* — Isidore PLLC

(57) ABSTRACT

Embodiments of the present application are directed to a method and apparatus for frequency hopping for control channels for devices with reduced capabilities. The method may include: receiving configurations of a plurality of bandwidth parts (BWPs); receiving a configuration of control channel offset for a control channel; determining a corresponding control channel resource in a corresponding BWP for each set of a plurality of sets of repetitions by using at least the configuration of the control channel offset and the configurations of the BWPs.

20 Claims, 7 Drawing Sheets

(56) References Cited

FOREIGN PATENT DOCUMENTS

| | | |
|---|---|---|
| CN | 110839291 A | 2/2020 |
| CN | 111034097 A | 4/2020 |

OTHER PUBLICATIONS

NTT Docomo, Inc. 3GPP Draft, R-11713948, Aug. 20, 2017, 3rd Generation Partnership Project (3GPP) Mobile Competence Centre, 650, route des Lucioles, F-06921 Sophia-Antipolis, Cedex, France, URL: http:/www.3gpp.org/ftp/Meetings_3GPP_SYNC/RAN1/DOCS/.

* cited by examiner

METHOD AND APPARATUS FOR FREQUENCY HOPPING FOR CONTROL CHANNELS FOR DEVICES WITH REDUCED CAPABILITIES

TECHNICAL FIELD

The present application generally relates to wireless communication technology, and especially to a method and apparatus for frequency hopping for control channels for devices with reduced capabilities.

BACKGROUND

In 3GPP new radio (NR) scenario, a reduced capability NR device is introduced. The reduced capability NR device may also be referred to as a device with reduced capabilities or a RedCap UE. The RedCap UE may serve the use cases such as industrial wireless sensors, video surveillances and wearables. Compared with legacy enhanced mobile broadband (eMBB) and ultra-reliable and low latency communications (URLLC) UEs (also called legacy UEs or legacy devices in the present application), the RedCap UE requires lower data rates, lower reliability requirements (for most of the use cases), higher latency (for most of the use cases) and long batter life.

For the RedCap UE, it should be configured with a lower size bandwidth part (BWP). Although the power consumption is lower for the lower size BWP, the coverage performance might be impacted. Therefore, how to enhance the coverage performance for the RedCap UE needs to be considered.

SUMMARY OF THE APPLICATION

Embodiments of the present application provide a method and apparatus for frequency hopping for control channels for devices with reduced capabilities.

An embodiment of the present application provides a method. The method may include: receiving configurations of a plurality of bandwidth parts (BWPs); receiving a configuration of control channel offset for a control channel; and determining a corresponding control channel resource in a corresponding BWP for each set of a plurality of sets of repetitions by using at least the configuration of the control channel offset and the configurations of the BWPs.

In an embodiment of the present application, a first set of repetitions happens in the active BWP, and the rest sets of repetitions happen in a BWP determined by the control channel offset. One set of the plurality of sets of repetitions includes at least one control channel repetition. In an example, the control channel is a physical downlink control channel (PDCCH), the control channel resource is a control resource set (CORESET), and the control channel offset includes a CORESET offset and a BWP offset. In another example, the control channel is a PDCCH, the control channel resource is a CORESET, and the control channel offset is a CORESET offset. A plurality of CORESETs are sequentially numbered in the configured BWPs.

In an embodiment of the present application, determining the corresponding control channel resource in the corresponding BWP for each set of the plurality of sets of repetitions includes: determining a control channel resource for each repetition of a first set of repetitions in the configured control channel resource in the active BWP; and determining a control channel resource for each repetition of a second set of repetitions based on the configuration of the control channel offset. The method may further include: receiving control information in the control channel for a first set of repetitions in the plurality of sets of repetitions in the determined corresponding control channel resource in a first configured BWP; and receiving control information in the control channel for each repetition of the second set of repetitions in the plurality of sets of repetitions in the determined control channel resource in a second configured BWP.

In an embodiment of the present application, determining the corresponding control channel resource in the corresponding BWP for each set of the plurality of sets of repetitions may further include: determining a control channel resource for each repetition of a third set of repetitions based on the configuration of the control channel offset, and the method may further include: receiving control information in the control channel for the third set of repetitions in the plurality of sets of repetitions in the determined control channel resource in a third configured BWP.

In an embodiment of the present application, the method may further include: determining a search space set that is associated with the determined CORESET; and receiving each repetition of the each set of repetitions in the determined search space set.

In an embodiment of the present application, a starting orthogonal frequency division multiplexing (OFDM) symbol of the search space set in the determined CORESET is the same as a starting OFDM symbol of a plurality of search space sets configured in the determined CORESET. In another example, a starting OFDM symbol of the search space set in the determined CORESET is the same as a starting OFDM symbol of a search space set with an index determined by a search space set index for the first set of repetitions. In yet another example, a starting OFDM symbol of the search space set in the determined CORESET is the same as a starting OFDM symbol of a predefined search space set configured in the determined CORESET.

In an embodiment of the present application, a configuration of aggregation levels and candidates of the search space set in the determined CORESET is the same as that in a search space set for the first set of repetitions. In another example, a configuration of aggregation levels and candidates of the search space set in the determined CORESET is a subset of that in the search space set for the first set of repetitions. A highest aggregation level and a number of the candidates for each aggregation level of the search space set in the determined CORESET are determined by a size of the determined CORESET.

In an embodiment of the present application, the control channel is a PDCCH, the control channel resource is a search space set, and the control channel offset is a BWP offset and a search space set offset.

In an embodiment of the present application, the control channel is a PDCCH, the control channel resource is a search space set, and the control channel offset is a search space set offset.

In an embodiment of the present application, a plurality of search space sets are sequentially numbered in the configured BWPs.

In an embodiment of the present application, the control channel is a physical uplink control channel (PUCCH), the control channel resource is a PUCCH resource, and the control channel offset includes a BWP offset, a PUCCH resource set offset and a PUCCH resource offset.

In an embodiment of the present application, the control channel is a PUCCH, the control channel resource is a PUCCH resource, and the control channel offset is a PUCCH resource offset.

In an embodiment of the present application, a plurality of PUCCH resources are sequentially numbered in the configured BWPs. The numbering is for the PUCCH resources with the same PUCCH format.

In an embodiment of the present application, determining the corresponding control channel resource in the corresponding BWP for each set of the plurality of sets of repetitions comprises: determining a control channel resource for each repetition of a first set of repetitions in the configured control channel resource in the active BWP; and determining a control channel resource for each repetition of a second set of repetitions based on the configuration of the control channel offset, wherein the method further comprises: transmitting control information in the control channel for a first set of repetitions in the plurality of sets of repetitions in the determined corresponding control channel resource in a first configured BWP; and transmitting control information in the control channel for each repetition of the second set of repetitions in the plurality of sets of repetitions in the determined control channel resource in a second configured BWP.

Another embodiment of the present application provides a method. The method may include: transmitting configurations of a plurality of bandwidth parts (BWPs); transmitting a configuration of control channel offset for a control channel; and determining a corresponding control channel resource in a corresponding BWP for each set of a plurality of sets of repetitions by using at least the configuration of the control channel offset and the configurations of the BWPs.

In an embodiment of the present application, determining the corresponding control channel resource in the corresponding BWP for each set of the plurality of sets of repetitions includes: determining a control channel resource for each repetition of a first set of repetitions in the configured control channel resource in the active BWP; and determining a control channel resource for each repetition of a second set of repetitions based on the configuration of the control channel offset. The method may further include: transmitting control information in the control channel for a first set of repetitions in the plurality of sets of repetitions in the determined corresponding control channel resource in a first configured BWP; and transmitting control information in the control channel for each repetition of the second set of repetitions in the plurality of sets of repetitions in the determined control channel resource in a second configured BWP.

In an embodiment of the present application, determining the corresponding control channel resource in the corresponding BWP for each set of the plurality of sets of repetitions may further include: determining a control channel resource for each repetition of a third set of repetitions based on the configuration of the control channel offset, and the method may further include: transmitting control information in the control channel for the third set of repetitions in the plurality of sets of repetitions in the determined control channel resource in a third configured BWP.

In an embodiment of the present application, the method may further include: determining a search space set that is associated with the determined CORESET; and transmitting each repetition of the each set of repetitions in the determined search space set.

In an embodiment of the present application, determining the corresponding control channel resource in the corresponding BWP for each set of the plurality of sets of repetitions may include: determining a control channel resource for each repetition of a first set of repetitions in the configured control channel resource in the active BWP; and determining a control channel resource for each repetition of a second set of repetitions based on the configuration of the control channel offset, wherein the method may further include: receiving control information in the control channel for a first set of repetitions in the plurality of sets of repetitions in the determined corresponding control channel resource in a first configured BWP; and receiving control information in the control channel for each repetition of the second set of repetitions in the plurality of sets of repetitions in the determined control channel resource in a second configured BWP.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can enhance the coverage performance for devices with reduced capabilities.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
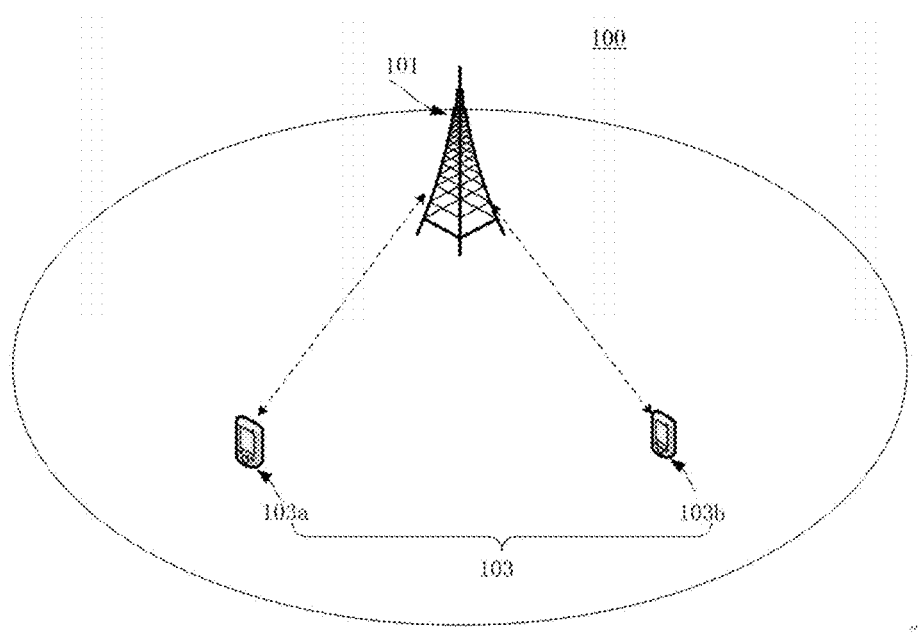
FIG. 1 illustrates a wireless communication system according to some embodiments of the present application.

FIG. 1 is a schematic diagram illustrating an exemplary wireless communication system 100 according to an embodiment of the present application.

As shown in FIG. 1, the wireless communication system 100 can include at least one base station (BS) 101 and at least one UE 103. Although a specific number of BSs 101 and UEs 103, e.g., only one BS 101 and two UEs 103 (e.g., UE 103a and UE 103b) are depicted in FIG. 1, one skilled in the art will recognize that any number of the BSs 101 and UEs 103 may be included in the wireless communication system 100.

The BS 101 may be distributed over a geographic region, and generally be a part of a radio access network that may include one or more controllers communicably coupled to one or more corresponding BSs. In some embodiments of the present application, each BS 101 may also be referred to as an access point, an access terminal, a base, a macro cell, a Node-B, an evolved Node B (eNB), a gNB, a Home Node-B, a relay node, a device, or described using other terminology used in the art.

The UE 103a may be a normal UE (or regular UE) compatible with existing technology. The UE 103a may be a legacy UE (or called legacy device), for example, a legacy eMBB UE or a legacy URLLC UE. For example, the UE 103a may be computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 103a may be a portable wireless communication device, a smart phone, a cellular telephone, a flip phone, a device having a subscriber identity module, a personal computer, a selective call receiver, or any other device that is capable of sending and receiving communication signals on a wireless network. Moreover, the UE 103a may be referred to as a subscriber unit, a mobile, a mobile station, a user, a terminal, a mobile terminal, a wireless terminal, a fixed terminal, a subscriber station, a user terminal, or a device, or described using other terminology used in the art.

The UE 103b may be a RedCap UE. Compared with legacy eMBB and URLLC UEs, the RedCap UE 103b requires lower data rates, lower reliability requirements, higher latency and long batter life, etc. For example, the UE 103b may be an industrial wireless sensor, a smart wearable, a video surveillance, or other devices with the characteristics of RedCap UE. The complexity reduction features of the RedCap UE 103b may include: reduced number of UE transmitting or receiving antennas, UE bandwidth reduction, half-duplex-frequency division duplex, relaxed UE processing time, relaxed UE processing capability, or the like.

In NR, the BS 101 may transmit downlink control information (DCI) for various purposes (such as, downlink data scheduling, uplink data scheduling, slot format indication etc.) in physical downlink control channel (PDCCH) to the UE 103a and UE 103b.

In NR, for resource allocation, control resource set (CORESET) is introduced. For example, in the transmitter side (such as, the BS 101), a DCI is transmitted in a CORESET, which is corresponding to a specific region in frequency domain (for example, indicated in frequencyDomainResources field) and a duration in time domain (for example, indicated in duration field). For frequency domain resource, a CORESET consists of a set of control channel elements (CCEs), and each CCE consists of 6 physical resource blocks (RBs). Multiple CCEs can be aggregated for transmitting a DCI, the number of CCEs used for a DCI transmission is called a CCE aggregation level (AL), and the CCE AL may be one of 1, 2, 4, 8 and 16. For time domain resource, a duration may consist of 1, 2, or 3 OFDM symbols. The detail parameters for a CORESET may be configured by a higher layer signaling, such as radio resource control (RRC) signaling.

Furthermore, in order for a UE to find the location of the exact starting symbol of the CORESET, a search space set is introduced. That is, the search space set is an area within a CORESET that the UE should monitor to detect a specific PDCCH or DCI.

For example, in the receiver side (such as, the UE 103a or the UE 103b), PDCCH is detected in the configured search space sets. Each search space set is associated with a CORESET, i.e., a CORESET is the physical resources from which the search space set is defined. Multiple search space sets could be configured to the UE, and each search space set may be associated with a same CORESET, but are configured with different parameters, such as, different DCI formats. A search space set consists of a set of search spaces, and each search space may correspond to a CCE aggregation level. Each CCE aggregation level is further configured with a set of candidate control channels. Typically, the UE needs to blind detect each candidate control channel for each aggregation level for each configured search space set.

For better understanding of the NR search space set, the search space set configurations in the NR specification (SearchSpace in 3GPP TS 38.331) are provided below.

```
SearchSpace ::=                           SEQUENCE {
    searchSpaceId                             SearchSpaceId,
    controlResourceSetId                      ControlResourceSetId
    OPTIONAL,   -- Cond SetupOnly
    monitoringSlotPeriodicity AndOffset       CHOICE {
        sl1                                       NULL,
        sl2                                       INTEGER (0..1),
        sl4                                       INTEGER (0..3),
        sl5                                       INTEGER (0..4),
        sl8                                       INTEGER (0..7),
        sl10                                      INTEGER (0..9),
        sl16                                      INTEGER (0..15),
        sl20                                      INTEGER (0..19),
        sl40                                      INTEGER (0..39),
        sl80                                      INTEGER (0..79),
        sl160                                     INTEGER (0..159),
```

```
        sl320                               INTEGER (0..319),
        sl640                               INTEGER (0..639),
        sl1280                              INTEGER (0..1279),
        sl2560                              INTEGER (0..2559)
    }
OPTIONAL,       -- Cond Setup
    duration                                INTEGER (2..2559)
OPTIONAL,       -- Need R
    monitoringSymbolsWithinSlot             BIT STRING (SIZE (14))
OPTIONAL,       -- Cond Setup
    nrofCandidates                          SEQUENCE {
        aggregationLevel1                       ENUMERATED {n0, n1, n2, n3, n4, n5,
n6, n8},
        aggregationLevel2                       ENUMERATED {n0, n1, n2, n3, n4, n5,
n6, n8},
        aggregationLevel4                       ENUMERATED {n0, n1, n2, n3, n4, n5,
n6, n8},
        aggregationLevel8                       ENUMERATED {n0, n1, n2, n3, n4, n5,
n6, n8},
        aggregationLevel16                      ENUMERATED {n0, n1, n2, n3, n4, n5,
n6, n8}
    }
OPTIONAL,       -- Cond Setup
    searchSpaceType                         CHOICE {
        common                                  SEQUENCE {
            dci-Format0-0-AndFormat1-0              SEQUENCE {
            ...
        }
OPTIONAL,       -- Need R
            dci-Format2-0                           SEQUENCE {
                nrofCandidates-SFI                      SEQUENCE {
                    aggregationLevel1                       ENUMERATED {n1,
n2}            OPTIONAL,       -- Need R
                    aggregationLevel2                       ENUMERATED {n1,
n2}            OPTIONAL,       -- Need R
                    aggregationLevel4                       ENUMERATED {n1,
n2}            OPTIONAL,       -- Need R
                    aggregationLevel8                       ENUMERATED {n1,
n2}            OPTIONAL,       -- Need R
                    aggregationLevel16                      ENUMERATED {n1,
n2}            OPTIONAL         -- Need R
                },
                ...
            }
OPTIONAL,       -- Need R
            dci-Format2-1                           SEQUENCE {
                ...
            }
OPTIONAL,       -- Need R
            dci-Format2-2                           SEQUENCE {
                ...
            }
OPTIONAL,       -- Need R
            dci-Format2-3                           SEQUENCE {
                dummy1                                  ENUMERATED {sl1, sl2,
sl4, sl5, sl8, sl10, sl16, sl20}    OPTIONAL,       -- Cond Setup
                dummy2                                  ENUMERATED {n1, n2},
                ...
            }
OPTIONAL        -- Need R
        },
        ue-Specific                             SEQUENCE {
            dci-Formats                             ENUMERATED {formats 0-
0-And-1-0, formats0-1-And-1-1},
            ...,
            [[
            dci-Formats-MT-r16                      ENUMERATED {formats2-5}
OPTIONAL,       -- Need R
            dci-FormatsSL-r16                       ENUMERATED {formats0-0-And-1-
0, formats0-1-And-1-1, formats3-0, formats3-1,
                                                                formats3-0-And-3-1}
OPTIONAL,       -- Need R
            dci-FormatsExt-r16                      ENUMERATED {formats0-2-And-1-2,
formats0-1-And-1-1And-0-2-And-1-2}
OPTIONAL        -- Need R
            ]]
        }
    }
}
```

-continued

```
OPTIONAL    -- Cond Setup2
}
SearchSpaceExt-r16 ::=            SEQUENCE {
    controlResourceSetId-r16          ControlResourceSetId-r16
OPTIONAL,   -- Cond SetupOnly2
    searchSpaceType-r16               SEQUENCE {
        common-r16                        SEQUENCE {
            dci-Format2-4-r16                 SEQUENCE {
                nrofCandidates-CI-r16             SEQUENCE {
                    aggregationLevel1-r16             ENUMERATED {n1, n2}
OPTIONAL,   -- Need R
                    aggregationLevel2-r16             ENUMERATED {n1, n2}
OPTIONAL,   -- Need R
                    aggregationLevel4-r16             ENUMERATED {n1, n2}
OPTIONAL,   -- Need R
                    aggregationLevel8-r16             ENUMERATED {n1, n2}
OPTIONAL,   -- Need R
                    aggregationLevel16-r16            ENUMERATED {n1, n2}
OPTIONAL    -- Need R
                },
                ...
            }
OPTIONAL,   -- Need R
            dci-Format2-5-r16                 SEQUENCE {
                nrofCandidates-IAB-r16            SEQUENCE {
                    aggregationLevel1-r16             ENUMERATED {n1, n2}
OPTIONAL,   -- Need R
                    aggregationLevel2-r16             ENUMERATED {n1, n2}
OPTIONAL,   -- Need R
                    aggregationLevel4-r16             ENUMERATED {n1, n2}
OPTIONAL,   -- Need R
                    aggregationLevel8-r16             ENUMERATED {n1, n2}
OPTIONAL,   -- Need R
                    aggregationLevel16-r16            ENUMERATED {n1, n2}
OPTIONAL    -- Need R
                },
                ...
            }
OPTIONAL,   -- Need R
            dci-Format2-6-r16                 SEQUENCE }
            ...
        }
OPTIONAL,   -- Need R
        ...
    }
}
OPTIONAL,   -- Cond Setup3
    searchSpaceGroupIdList-r16        SEQUENCE (SIZE (1..2)) OF
INTEGER (0..1)      OPTIONAL,    -- Need R
    freqMonitorLocations-r16          BIT STRING (SIZE (5))
OPTIONAL    -- Need R
}
```

It should be noted that a search space set is defined on a CORESET, but the CORESET does not have configuration on where to start the control resource, but just a duration in terms of number of OFDM symbols in time domain. Instead, the starting symbol is configured in the search space set configuration by "monitoringsymbolswithinslot" field. That is to say, in a NR slot, it is possible that two search space sets are associated with a same CORESET, but with a different starting OFDM symbol.

For NR, a wideband carrier may be divided into one or more subbands. Each subband may be referred to as a "bandwidth part (BWP)". The BWP provides a means for handling different device capabilities in terms of bandwidth support. Furthermore, the BWP also provides a means for saving UE side power consumption since a UE could be configured with a narrower BWP for receiving control channel, and switch to a wider BWP when a large amount of data is scheduled. As specified, a UE could be configured with multiple BWPs within a network carrier, each with separated configurations in terms of e.g. bandwidth, numerology, physical channel configuration, etc. There is only one BWP being active in a time, and the UE could switch the active BWP by either RRC signaling, or DCI signaling, or a timer-based switching.

Generally, for the legacy UE, it may be configured with higher size BWPs for higher data rate requirements, while for the RedCap UE (such as an industrial wireless sensor), it should be configured with lower size BWPs, e.g., lower than 5 MHz to enable power saving, since the requirement of the attainable data rate is quite low, which is smaller than 2 Mbps, while the requirement for the battery life is quite harsh, for example, at least a few years of battery life is required for this kind of UE.

It is noticed that although power consumption is lower for a lower size BWP, the coverage performance might be impacted.

In an example, the coverage performance for PDCCH may be impacted. For example, the CORESET in such a lower size BWP may not support a high aggregation level, e.g., AL=16 with the supportable maximum 3 OFDM symbols. For example, if the BWP is 5 MHz and the subcarrier spacing (SCS) is 30 kHz, the CORESET with 6 CCEs and 3 OFDM symbols in such BWP only supports AL=4.

In another example, the coverage performance for a physical uplink control channel (PUCCH) may be impacted. Currently, PUCCH frequency hopping is performed within the active BWP, therefore with a low size BWP, the frequency diversity gain is limited.

In order to enhance coverage performance for the PDCCH, PDCCH repetition could be introduced. Then for both the PDCCH and the PUCCH repetition, it is expected that frequency hopping could be applied on top of the repetitions and is performed in a wider bandwidth region, rather than within the active BWP, which has limited size in frequency domain. Based on these, the problem is that for the RedCap UEs configured with a limited BWP size, how to perform frequency hopping for the PDCCH and the PUCCH in a wide bandwidth to harvest frequency diversity gain for both channels.

In the embodiments of the present application, to perform frequency hopping for RedCap UEs in a wider bandwidth, the frequency hopping is across explicitly configured BWPs.

Figure 2:
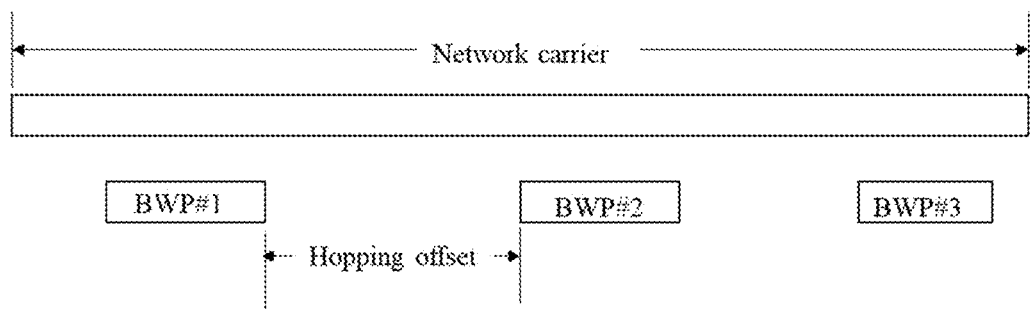
FIG. 2 illustrates an example of frequency hopping for devices with reduced capabilities according to some embodiments of the present application

FIG. 2 illustrates an example of frequency hopping for Redcap UEs according to some embodiments of the present application.

As shown in FIG. 2, BWP #1, BWP #2 and BWP #3 are explicitly configured BWPs. In an example, the frequency hopping may be across the BWP #1 and the BWP #2. In another example, the frequency hopping may be across the BWP #1, the BWP #2 and the BWP #3. Although three configured BWPs are shown in FIG. 2, it should be understood that more BWPs may be configured by the network carrier if needed, and the frequency hopping may be across these more BWPs.

The following will describe frequency hopping operations for control channels for the RedCap UEs according to the embodiments of the present application by taking the frequency hopping across the BWP #1 and the BWP #2 as an example. The control channels may include PDCCH and PUCCH.

Figure 3:
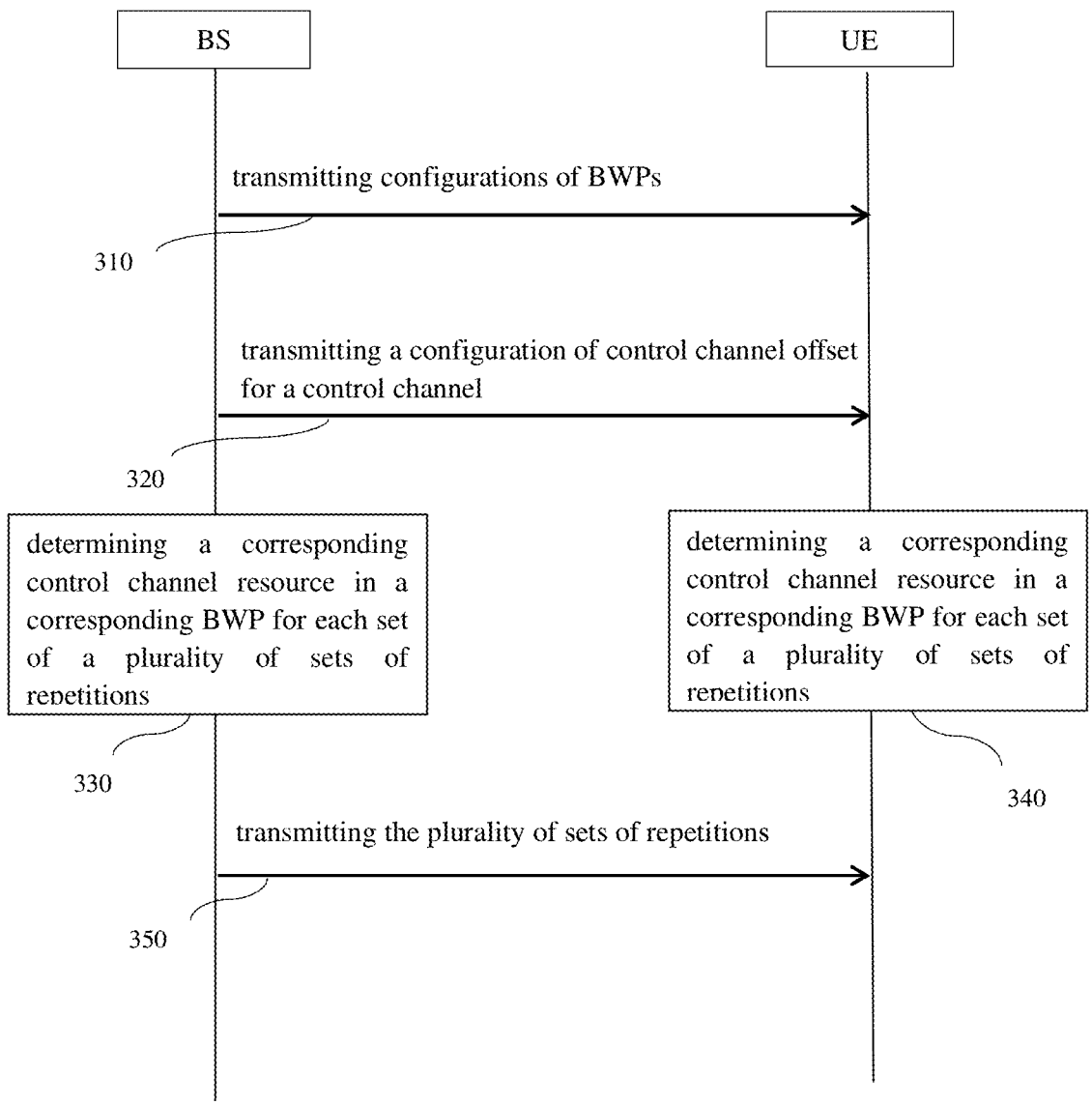
FIG. 3 is a flow diagram illustrating a method for frequency hopping for control channels for devices with reduced capabilities according to some embodiments of the present application.

FIG. 3 is a flow diagram illustrating a method for frequency hopping for control channels for devices with reduced capabilities according to some embodiments of the present application.

As shown in FIG. 3, in step 310, a BS (e.g., BS 101 in FIG. 1) may transmit configurations of a plurality of BWPs. For example, a configuration of a BWP may include a starting position of physical resource block (PRB) and the number of the occupied PRB (such as indicated in LocationAndBandwidth filed), subcarrier spacing (SCS), detailed configurations for control channel and data channel, and so on.

In step 320, the BS may transmit a configuration of control channel offset for a control channel. The control channel may be PDCCH or PUCCH. The control channel offset may be called hopping offset. The hopping offset is configured for a per-channel basis for RedCap UEs. For control channels, a specific control channel offset is configured for each control channel.

For example, for the PDCCH, in an embodiment of the present application, the control channel offset includes a BWP offset (for example, the "offset" as shown in FIG. 2) and a CORESET offset; in another embodiment of the present application, the control channel offset includes a BWP offset and a search space set offset; in another embodiment of the present application, the control channel offset is just a CORESET offset; in another embodiment of the present application, the control channel offset is just a search space set offset. Furthermore, a plurality of CORESETs or a plurality of search space sets are sequentially numbered across the configured BWPs. In one embodiment, the control channel offset is configured for a CORESET, and each of the search space sets that are associated with the same CORESET follow the control channel offset for control channel hopping. In another embodiment, the control channel offset is configured per search space set.

For the PDCCH, the CORESET offset or search space set offset may be used to indicate which CORESET or which search space set to be camped on by the UE to receive PDCCH or DCI on the PDCCH. In the embodiments of the present application, the UE may be configured with multiple CORESETs (up to 3 CORESETs in a BWP as specified) and/or multiple search space sets (up to 10 search space sets in a BWP per each CORESET). Therefore, based on the CORESET offset or search space set offset, the UE may know which CORESET or which search space set to be camped on to receive PDCCH or DCI on the PDCCH. That is the reason for introducing the CORESET offset or the search space set offset in the embodiments of the present application.

For the PUCCH, in an embodiment of the present application, the control channel offset includes a BWP offset and a PUCCH resource offset; in another embodiment of the present application, the hopping offset is just a PUCCH resource offset.

Although the step 310 is described before the step 320, it does not mean the step 310 is performed before the step 320. In some embodiments, the step 310 may be performed before the step 320, in some other embodiments, the step 310 and the step 320 may be performed at the same time, and in some other embodiments, the step 310 may be performed after the step 320.

In step 330, the BS may determine a corresponding control channel resource in a corresponding BWP for each set of a plurality of sets of repetitions, by using at least the configuration of the control channel offset and the configurations of the BWPs. One set of the plurality of sets of repetitions may include at least one control channel repetition. As one embodiment, for a specific search space set, the first set of repetitions starts from the active BWP in the slots defined by "duration" in the searchspace configuration, and the second set of repetitions starts after the end of the first set of repetitions and happens in the BWP determined by the control channel offset.

Similarly, in step 340, after receiving the configuration of the control channel offset and the configurations of the BWPs, the UE may determine a corresponding control channel resource in a corresponding BWP for each set of a plurality of sets of repetitions, by using at least the received configuration of the control channel offset and the received configurations of the BWPs. One set of the plurality of sets of repetitions may include at least one control channel repetition.

For example, in an embodiment of the present application, there are two sets of repetitions for a total configured number of repetitions, that is, a first set of repetitions and a second set of repetitions, each with same number of repetitions. Step 330 and 340 may include determining a control channel resource for each repetition of the first set of repetitions in the active BWP, and determining a control channel resource for each repetition of the second set of repetitions based on the configuration of the control channel offset.

And then, in step 350, the BS may transmit the plurality of sets of repetitions according to the determined corresponding control channel resource in the corresponding BWP for each set of the plurality of sets of repetitions. Correspondingly, the UE may receive the plurality of sets of repetitions according to the determined corresponding control channel resource in the corresponding BWP for each set of the plurality of sets of repetitions.

For example, for the two sets of repetitions, that is, the first set of repetitions and the second set of repetitions, in the step 350, the BS may transmit control information in the control channel for a first set of repetitions in the plurality of sets of repetitions in the determined corresponding control channel resource in a first configured BWP, which is the active BWP, and transmit control information in the control channel for each repetition of the second set of repetitions in the plurality of sets of repetitions in the determined control channel resource in a second configured BWP.

Correspondingly, the UE may receive control information in the control channel for a first set of repetitions in the plurality of sets of repetitions in the determined corresponding control channel resource in a first configured BWP from the BS, and the UE may receive control information in the control channel for each repetition of the second set of repetitions in the plurality of sets of repetitions in the determined control channel resource in a second configured BWP from the BS.

In the above description, for the two sets of repetitions, the frequency hopping is across 2 BWPs, for example, the BWP #1 and the BWP #2. In other embodiments of the present application, the frequency hopping may be across more than 2 BWPs, such as, 3 BWPs, 4 BWPs, or the like. For example, in another embodiment, the method may include the BS may determine a control channel resource for a third set of repetitions based on the configuration of the control channel offset, and then the BS transmits control information in the control channel for the third set of repetitions in the plurality of sets of repetitions in the determined control channel resource in a third configured BWP. Correspondingly, the UE may determine a control channel resource for a third set of repetitions based on the configuration of the control channel offset, and then receives the control information in the control channel for the third set of repetitions in the plurality of sets of repetitions in the determined control channel resource in a third configured BWP from the BS.

The following will describe the above described method for frequency hopping for control channels for devices with reduced capabilities in FIG. 3 in detail in conjunction with the detail embodiments of the present application. The following embodiments will be described by taking the frequency hopping being across 2 BWPs (such as, BWP #1 and BWP #2) as an example.

In an embodiment, the control channel is a PDCCH, the control channel resource is a CORESET, and the control channel offset includes a CORESET offset and a BWP offset. A configuration of the BWP offset may be configured in the configuration for hopping. In one embodiment, the BWP offset is the offset relative to BWP #0, i.e., the BWP offset is the BWP ID. In another embodiment, the CORESET offset is the offset relative to CORESET #0, i.e., the CORESET offset is the CORESET ID.

After receiving the configurations of the BWPs and the configuration of the control channel offset including the CORESET offset and the BWP offset from the BS, the UE may start receiving PDCCH from a configured BWP (the active BWP, such as BWP #1) for a first repetition and determine the CORESET for a second repetition in another configured BWP (such as BWP #2) based on the configuration of the CORESET offset and the BWP offset. In this example, two repetitions (the first repetition and the second repetition) are configured.

In another example, more than 2 repetitions, such as, 4 repetitions are configured. After receiving the configurations of the BWPs and the configuration of the control channel offset including the CORESET offset and the BWP offset from the BS, the UE may start receiving PDCCH from a configured BWP (active BWP, such as BWP #1) for a first set of repetitions (such as, the first 2 repetitions) and determine the CORESET for a second set of repetitions (such as, the last 2 repetitions) in another configured BWP (such as BWP #2) based on the configuration of the CORESET offset and the BWP offset.

In another embodiment, the control channel is a PDCCH, the control channel resource is a CORESET, and the control channel offset is a CORESET offset. Furthermore, a plurality of CORESETs are sequentially numbered in the configured BWPs. The CORESET offset is configured based on the numbered CORESETs across the BWPs. As an example, for CORESET #m, if the configured control channel offset is n−m, then the first set of repetitions are detected in CORESET #m and the second set of repetitions are detected in CORESET #n.

After receiving the configurations of the BWPs and the configuration of the control channel offset only including the CORESET offset from the B S, the UE may start receiving PDCCH from a configured BWP (such as BWP #1) for a first repetition and determine the CORESET for a second repetition in another configured BWP (such as BWP #2) based on the configuration of the CORESET offset. In this example, two repetitions are configured.

In another example, more than 2 repetitions, such as, 4 repetitions may be configured. After receiving the configurations of the BWPs and the configuration of the CORESET offset from the BS, the UE may start receiving PDCCH from a configured BWP (such as BWP #1, which is the active BWP) for a first set of repetitions (such as, the first 2 repetitions) and determine the CORESET for a second set of repetitions (such as, the last 2 repetitions) in another configured BWP (such as BWP #2) based on the configuration of the CORESET offset.

For the embodiments of frequency hopping with the CORESET offset (or plus the BWP offset), all the search space sets that associated with a same CORESET will follow the configurations for hopping operation. Therefore, the embodiments of frequency hopping with the CORESET offset have lower signaling overhead than the embodiment(s) of frequency hopping with a search space offset. For each search space set in one CORESET, UE will determine a corresponding search space set in another CORESET implicitly. Specifically, the UE needs to determine the starting OFDM symbol and the available AL and/or candidates for this search space set.

Thus, after determining the CORESET for the second repetition (or the second set of repetitions, such as, the last 2 repetitions) in another configured BWP (such as BWP #2) based on the configuration of the CORESET offset, the UE may further determine the starting OFDM symbol and the available AL and/or candidates for a search space set that is associated with the determined CORESET, and receive the second repetition (or each repetition of the second set of repetitions) in the determined search space set from the BS.

For example, for the convenience of description, it assumes that PDCCH repetitions (indicated by a PDCCH repetition number) happen in slot #k and slot #k+1, the hopping is between CORESET #m (in BWP #1) in slot #k and CORESET #n (in BWP #2) in slot #k+1, and DCI is transmitted through one candidate in search space set #x in CORESET #m in slot #k for the first repetition.

For example, according to the PDCCH repetition number configured in the CORESET configuration, for example, the PDCCH repetition number is set to 2, then the UE will detect a first DCI repetition in slot #k and detect a second DCI repetition in slot #k+1. The first repetition starts from the active BWP, i.e., BWP #1, and the second repetition happens in BWP #2, based on the configured control channel offset. According to the configured CORESET offset, the UE could know which CORESET will be camped on in each repetition, in other words, the UE could know that the hopping is between CORESET #m (in BWP #1) in slot #k and CORESET #n (in BWP #2) in slot #k+1 from configured offset equal to n−m. The search space set #x may be configured in the configuration for BWP #1 and associated with the CORESET #m, for example, a configuration of search space set #x may be transmitted by the BS to the UE.

In general, after receiving the configuration of the search space set #x, the UE may detect each candidate in search space set #x in CORESET #m in slot #k and obtain soft information corresponding to each candidate. The UE may detect each candidate in search space set #y in CORESET #n in slot #k+1 and obtain soft information corresponding to each candidate. And then the UE combines and decode the obtained two soft information and determine whether the decoded information corresponds to its DCI.

In this embodiment, search space set #y in CORESET #n of BWP #2 in slot #k+1 is determined implicitly. In other words, other search space set of CORESET #n may not be configured in slot #k+1. And then the UE may determine the starting OFDM symbol of search space set #y of CORESET #n of BWP #2 in slot #k+1 as follows.

In an example, if one or more search space sets of CORESET #n are available in slot #k+1 with same starting OFDM symbol, then the search space set #y has the same starting OFDM symbol with these search space sets.

In another example, if two or more search space sets of CORESET #n are available in slot #k+1 with Y available starting OFDM symbols, then the search space set #y has the same starting OFDM symbol with one of the search space set, with an index=mod(x, Y). In another embodiment, if there are T search space sets of CORESET #m available in slot #k, and search space set x is correspondingly the $t^{th}$ search space sets, then the search space set #y has the same starting OFDM symbol with one of the search space set, with an index=mod(t, Y).

In yet another embodiment, if no search space set of CORESET #n is available in slot #k+1, then the starting OFDM symbol of search space set #y is determined by the starting OFDM symbol of a predefined search space set, e.g., the search space set with lowest index or highest index.

From such principles, the DCI repetition transmitted in slot #k+1 in the candidate of search space set #y for a UE follows the starting OFDM symbols of existing search space sets, therefore reduces the impacts to the DCI transmission to other UEs.

Besides, the available AL and/or candidates of search space set #y is determined as below.

In an example, if CORESET #n is capable to provide the same set of AL/candidates with search space set #x, then search space set #y has the same set of AL/candidates with search space #x.

In another example, if CORESET #n cannot provide the same set of AL/candidates with search space set #x, the search space set #y has a subset of AL/candidates of search space #x, and the highest AL/candidates in search space set #y is the highest one that CORESET #n could provide. In other words, the highest AL and the number of the candidates for each AL of the search space set #y in the determined CORESET #n are determined by a size of the determined CORESET #n.

It should be understood that the BS may determine the starting OFDM symbol and the available AL and/or candidates for a search space set that is associated with the determined CORESET based on the same method as the above discussed for UE. In order to avoid repetition, the determining operation for the BS will not be described in detail. After determining the starting OFDM symbol and the available AL and/or candidates for the search space set that is associated with the determined CORESET, the BS may transmits each repetition of the second set of repetitions in the determined search space set based on the determined control resource resource to the UE.

Figure 4:
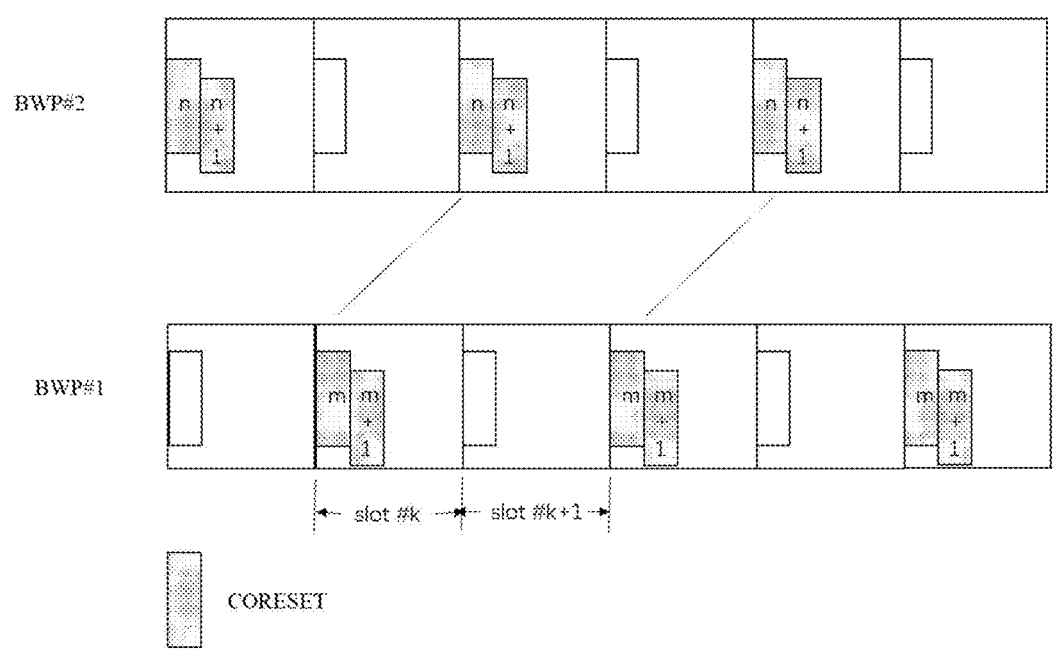
FIG. 4 illustrates an example of PDCCH hopping between CORESET #m and CORESET #n with a CORESET offset according to an embodiment of the present application.

FIG. 4 illustrate an example of PDCCH hopping between CORESET #m and CORESET #n with a CORESET offset according to an embodiment of the present application.

In this example, four configurations may be configured by the BS in the CORESET configuration: a PDCCH repetition number, enable/disable frequency hopping, enable/disable inter-slot repetition, and CORESET Offset.

The PDCCH repetition number may indicate the number of the PDCCH repetitions, such as, 2, 3, 4, or the like.

If a repetition number>1 is configured, the following operations will be performed: if frequency hopping is enabled, inter-slot frequency hopping for PDCCH is used anyway; if frequency hopping is disabled, and if inter-slot repetition is enabled, inter-slot repetition without frequency hopping is used; otherwise, intra-slot repetition is used.

According to the configured CORESET offset, the UE could know which CORESET will be camped on in each repetition. The example as shown in FIG. 4 illustrates the hopping across the CORESETs in BWP #1 and BWP #2 in slot #k and slot #k+1. The BWP #1 is the active BWP, and the first transmission always starts from BWP #1. Two CORESETs are configured in each BWP. A DCI is transmitted in CORESET #m in slot #k and repeated in CORESET #n in slot #k+1.

Figure 5:
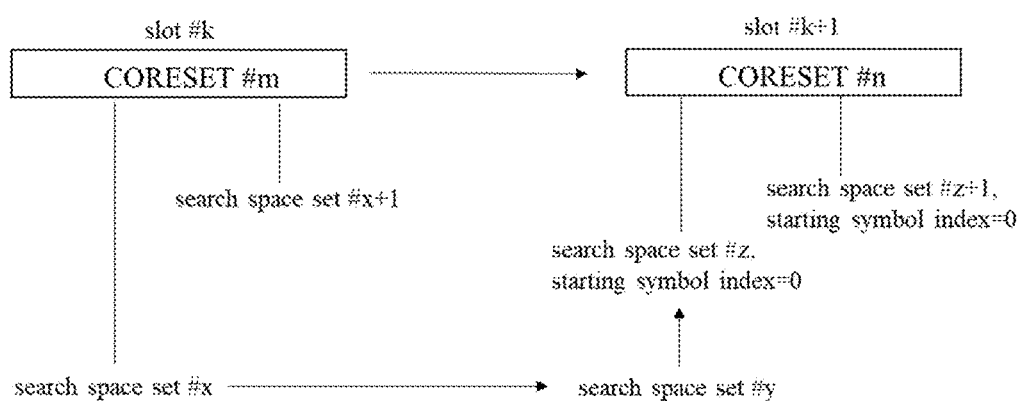
FIG. 5 illustrates an example of search space set determination in the hopping CORESET corresponding to FIG. 4 according to an embodiment of the present application.

FIG. 5 illustrates an example of search space set determination in the hopping CORESET corresponding to FIG. 4 according to an embodiment of the present application.

As shown in FIG. 5, the UE would detect the first repetition of the DCI in the search space set #x in slot #k, and determine a search space set #y in slot #k+1 implicitly.

In this example, the start symbol of the search space set #y is the same as the start symbol of search space set #z configured in CORESET #n according to the determining operations as described above. In addition, the available AL and/or candidate of search space #y follows the configurations of search space set #x, in the case that the CORESET #n could support the AL and/or candidates configured for search space set #x.

Although the above examples as shown in FIG. 4 and FIG. 5 describe the case of 2 repetitions being configured, it should be understood that more repetitions (e.g., 4 repetitions) may be configured, for example, with the first 2 repetitions (may be called a first set of repetitions) in the BWP #1 and with the second 2 repetitions (may be called a second set of repetitions) in the BWP #2. It should be also understood, in other embodiments, the repetitions may across more than 2 BWPs, for example, 3 BWPs, 4 BWPs, or the like. The similar operations as above described may be applied to these cases, which will not be described in detail for avoiding repetition.

In an embodiment, the control channel is a PDCCH, the control channel resource is a search space set, and the control channel offset is a BWP offset and a search space set offset. In one embodiment, the BWP offset is the offset relative to BWP #0, i.e., the BWP offset is the BWP ID. In another embodiment, the search space set offset is the offset relative to search space set #0, i.e., the CORESET offset is the CORESET ID. Furthermore, a plurality of search space sets are sequentially numbered in the configured BWPs.

This embodiment still takes hopping between search space #x and search space #y for two repetitions as an example.

After receiving the configurations of the BWPs and the configuration of the control channel offset including the BWP offset and the search space set offset from the BS, the UE may start receiving PDCCH from a configured BWP (such as BWP #1) for a first repetition and determine the search space set for a second repetition in another configured BWP (such as BWP #2) based on the configuration of the BWP offset and the search space set offset.

In another embodiment, the control channel is a PDCCH, the control channel resource is a search space set, and the control channel offset is a search space set offset. Furthermore, a plurality of search space sets are sequentially numbered in the configured BWPs. The search space set offset is configured based on the numbered search space sets across the configured BWPs. As an example, for search space set x, if the configured search space set offset is y−x, then the first set of repetitions are detected in search space #x and the second set of repetitions are detected in search space set #y.

This embodiment still takes hopping between search space #x and search space #y for two repetitions as an example.

After receiving the configurations of the BWPs and the configuration of the control channel offset only including the search space set offset from the BS, the UE may start receive a first PDCCH repetition from a configured BWP (such as BWP #1, the active BWP) for a first repetition and determine the search space set for a second PDCCH repetition in another configured BWP (such as BWP #2) based on the configuration of the search space set offset.

In particular, for the above embodiments of hopping with a search space set offset for PDCCH, for determining the starting OFDM symbol for search space #y in slot #k+1, the UE will just follow the configurations of search space set #y in slot #k+1 for DCI detection, no matter whether search space set #y is available in slot #k+1. Similarly, for determining the available AL and/or candidates of search space #y in slot #k+1, the UE will also follow the configurations of search space set #y in slot #k+1 for DCI detection.

In the above embodiments, 2 repetitions are configured, it should be understood that the determining operation also applies to more than 2 repetitions, such as, 4 repetitions or more repetitions, that is, a plurality of sets of repetitions. In the above description, the frequency hopping is across 2 BWPs, that is, the BWP #1 and BWP #2. In other embodiments of the present application, the frequency hopping may be across more than 2 BWPs, such as, 3 BWPs, 4 BWPs, or the like.

It should be understood that the BS may determine the search space set for a second repetition (or a second set of repetitions) in another configured BWP based on the same method as the above discussed for UE. In order to avoid repetition, the determining operation for the BS will not be described in detail. After determine the search space set for a second repetition (or a second set of repetitions), the BS may transmits the second repetition (or the second set of repetitions) in the determined search space set to the UE based on the determined control resource.

In an embodiment, the control channel is a physical uplink control channel (PUCCH), the control channel resource is a PUCCH resource, and the control channel offset includes a BWP offset, a PUCCH resource set offset and a PUCCH resource offset. In one embodiment, the BWP offset is the offset relative to BWP #0, i.e., the BWP offset is the BWP ID. The PUCCH resource set offset is the offset relative to PUCCH resource set #0, i.e., the PUCCH resource set offset is the PUCCH resource set ID. The PUCCH resource offset is the offset relative to PUCCH resource #0 in the determined PUCCH resource set, i.e., the PUCCH resource offset is the PUCCH resource ID.

This embodiment still takes hopping between search space #x and search space #y for two repetitions as an example.

After receiving the configurations of the BWPs and the configuration of the control channel offset including the BWP offset and the PUCCH resource offset from the BS, the UE may start receiving PDCCH from a configured BWP (such as BWP #1) for a first repetition and determine the control channel resource in in another configured BWP (such as BWP #2) for a second repetition based on the configuration of the BWP offset and the PUCCH resource offset.

In another embodiment, the control channel is a physical uplink control channel (PUCCH), the control channel resource is a PUCCH resource, and the control channel offset includes a PUCCH resource offset. Furthermore, a plurality of PUCCH resources are sequentially numbered in the configured PUCCH resource sets of the configured BWPs, and the numbering is for the PUCCH resources with the same PUCCH format. The control channel offset is configured based on the numbered PUCCH resources across the configured BWPs. As an example, for PUCCH resource #p, if the configured control channel offset is q−x, then the first set of repetitions are transmitted in PUCCH resource #p and the second set of repetitions are transmitted in PUCCH resource #q.

After receiving the configurations of the BWPs and the configuration of the control channel offset only including the PUCCH resource offset from the BS, the UE may start receiving a first PUCCH repetition from a configured BWP (such as BWP #1, the active BWP) for a first repetition and determine the control channel resource for PUCCH repetition(s) in another configured BWP (such as BWP #2) for a second PUCCH repetition based on the configuration of the PUCCH resource offset.

In the above embodiments for PUCCH hopping between BWPs, 2 repetitions are configured, it should be understood that the determining operation also applies to more than 2 repetitions, such as, 4 repetitions or more repetitions. In the above description, the frequency hopping is across 2 BWPs, that is, the BWP #1 and BWP #2. For example, in other embodiments of the present application, the frequency hopping may be across more than 2 BWPs, such as, 3 BWPs, 4 BWPs, or the like.

It should be understood that the BS may determine the PUCCH resource(s) resource for a second PUCCH repetition (or a second set of PUCCH repetitions) in another configured BWP based on the same method as the above discussed for UE. In order to avoid repetition, the determining operation for the BS will not be described in detail. After determine the control channel resource for PUCCH repetition(s), the BS may transmits the second PUCCH repetition (or the second set of PUCCH repetitions) to the UE based on the determined PUCCH resource(s).

Therefore, the above described embodiments can provide a method for frequency hopping for control channels for devices with reduced capabilities and can enhance the coverage performance for devices with reduced capabilities.

Figure 6:
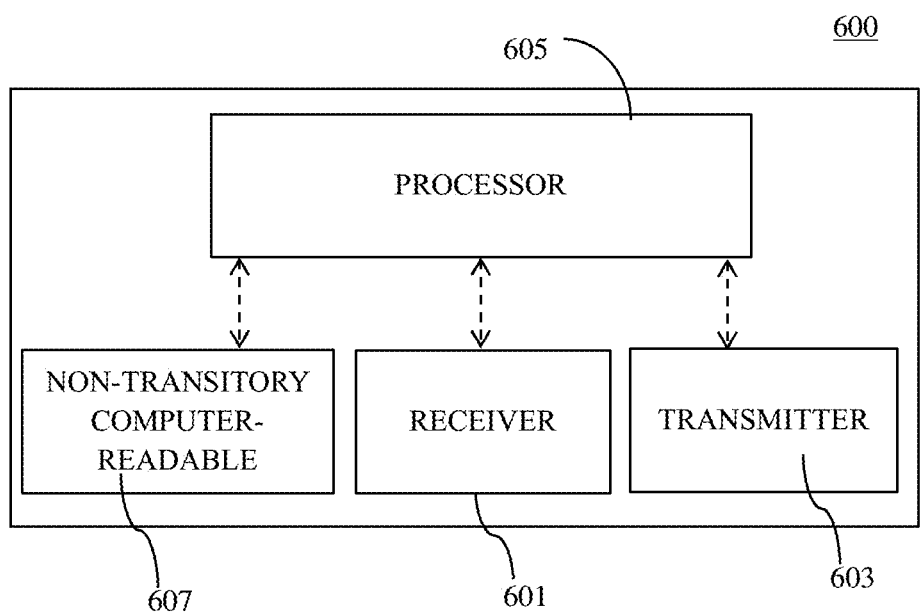
FIG. 6 illustrates an apparatus according to some embodiments of the present application.

FIG. 6 illustrates an apparatus according to some embodiments of the present application. In some embodiments of the present disclosure, the apparatus 600 may be a UE 103 as illustrated in FIG. 1 or other embodiments of the present application.

As shown in FIG. 6, the apparatus 600 may include a receiver 601, a transmitter 603, a processor 605, and a non-transitory computer-readable medium 607. The non-transitory computer-readable medium 607 has computer executable instructions stored therein. The processer 605 is configured to be coupled to the non-transitory computer readable medium 607, the receiver 601, and the transmitter 603. It is contemplated that the apparatus 600 may include more computer-readable mediums, receiver, transmitter and processors in some other embodiments of the present application according to practical requirements. In some embodiments of the present application, the receiver 601 and the transmitter 603 are integrated into a single device, such as a transceiver. In certain embodiments, the apparatus 600 may further include an input device, a memory, and/or other components.

In some embodiments of the present application, the non-transitory computer-readable medium 607 may have stored thereon computer-executable instructions to cause a processor to implement the method according to embodiments of the present application.

Figure 7:
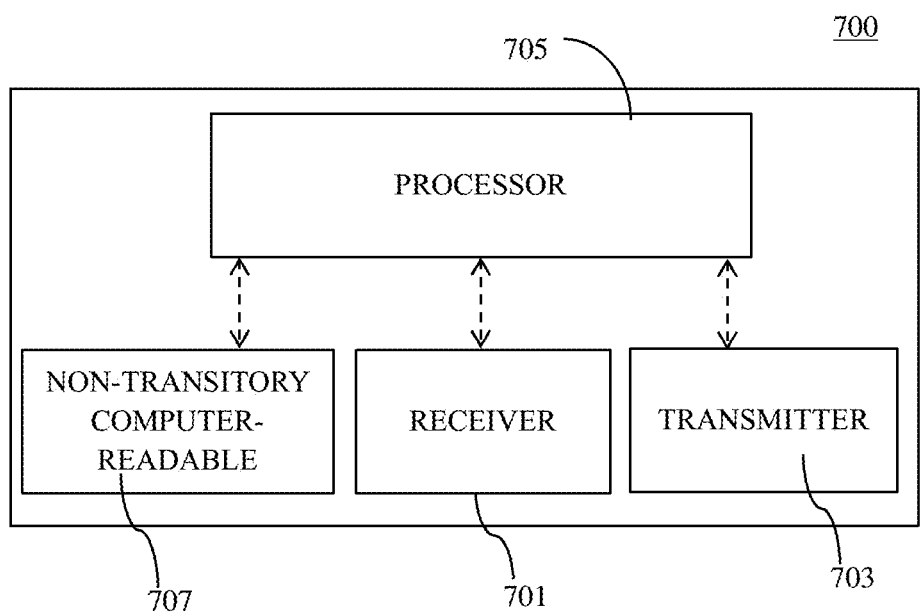
FIG. 7 illustrates an apparatus according to some embodiments of the present application.

FIG. 7 illustrates an apparatus according to some embodiments of the present application. In some embodiments of the present disclosure, the apparatus 700 may be a BS 101 as illustrated in FIG. 1 or other embodiments of the present application.

As shown in FIG. 7, the apparatus 700 may include a receiver 701, a transmitter 703, a processor 705, and a non-transitory computer-readable medium 707. The non-transitory computer-readable medium 707 has computer executable instructions stored therein. The processer 705 is configured to be coupled to the non-transitory computer readable medium 707, the receiver 701, and the transmitter 703. It is contemplated that the apparatus 700 may include more computer-readable mediums, receiver, transmitter and processors in some other embodiments of the present application according to practical requirements. In some embodiments of the present application, the receiver 701 and the transmitter 703 are integrated into a single device, such as a transceiver. In certain embodiments, the apparatus 700 may further include an input device, a memory, and/or other components.

In some embodiments of the present application, the non-transitory computer-readable medium 707 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method, comprising:
   receiving configurations of a plurality of bandwidth parts (BWPs);
   receiving a configuration of control channel offset for a control channel; and
   determining a corresponding control channel resource in a corresponding BWP for each set of a plurality of sets of repetitions of control channels by using at least the configuration of the control channel offset and the configurations of the BWPs.

2. The method of claim 1, wherein a first set of repetitions happens in an active BWP, and other sets of repetitions happen in a BWP determined by the control channel offset.

3. The method of claim 1, wherein the control channel is a physical downlink control channel (PDCCH), the control channel resource is a control resource set (CORESET), and the control channel offset includes at least one of a CORESET offset and a BWP offset.

4. The method of claim 3, further comprising:
   determining a search space set that is associated with a determined CORESET; and
   receiving each repetition of each set of repetitions in a determined search space set.

5. The method of claim 1, wherein:
   determining the corresponding control channel resource in the corresponding BWP for each set of the plurality of sets of repetitions comprises:
   determining a control channel resource for each repetition of a first set of repetitions in a configured control channel resource in an active BWP; and determining a control channel resource for each repetition of a second set of repetitions based on the configuration of the control channel offset; and the method further comprises:

receiving control information in the control channel for a first set of repetitions in the plurality of sets of repetitions in the determined corresponding control channel resource in a first configured BWP; and receiving control information in the control channel for each repetition of the second set of repetitions in the plurality of sets of repetitions in the determined control channel resource in a second configured BWP.

6. A user equipment (UE) comprising:
at least one non-transitory computer-readable medium having computer executable instructions stored therein;
at least one receiver;
at least one transmitter; and
at least one processor coupled to the at least one non-transitory computer-readable medium, the at least one receiver, and the at least one transmitter;
wherein the computer executable instructions cause the at least one processor to:
receive configurations of a plurality of bandwidth parts (BWPs);
receive a configuration of control channel offset for a control channel; and
determine a corresponding control channel resource in a corresponding BWP for each set of a plurality of sets of repetitions of control channels by using at least the configuration of the control channel offset and the configurations of the BWPs.

7. The UE of claim 6, wherein a first set of repetitions happens in an active BWP, and other sets of repetitions happen in a BWP determined by the control channel offset.

8. The UE of claim 6, wherein the control channel is a physical downlink control channel (PDCCH), the control channel resource is a control resource set (CORESET), and the control channel offset includes at least one of a CORESET offset and a BWP offset.

9. The UE of claim 6, wherein the control channel is a PDCCH, the control channel resource is a CORESET, and the control channel offset is a CORESET offset.

10. The UE of claim 9, wherein the at least one processor:
determines a search space set that is associated with a determined CORESET; and
receives each repetition of each set of repetitions in a determined search space set.

11. The UE of claim 10, wherein a starting orthogonal frequency division multiplexing (OFDM) symbol of the search space set in the determined CORESET is the same as a starting OFDM symbol of a plurality of search space sets configured in the determined CORESET.

12. The UE of claim 10, wherein a starting OFDM symbol of the search space set in the determined CORESET is the same as a starting OFDM symbol of a predefined search space set configured in the determined CORESET.

13. The UE of claim 10, wherein a starting OFDM symbol of the search space set in the determined CORESET is the same as a starting OFDM symbol of a search space set with an index determined by a search space set index for the first set of repetition.

14. The UE of claim 10, wherein a configuration of aggregation levels and candidates of the search space set in the determined CORESET is one of (i) the same as the configuration in a search space set for the first set of repetitions or (ii) a subset of the configuration in the search space set for the first set of repetitions.

15. The UE of claim 6, wherein:
to determine the corresponding control channel resource in the corresponding BWP for each set of the plurality of sets of repetitions, the at least one processor:
determines a control channel resource for each repetition of a first set of repetitions in a configured control channel resource in an active BWP; and
determines a control channel resource for each repetition of a second set of repetitions based on the configuration of the control channel offset; and
the computer executable instructions further cause the apparatus to:
receive control information in the control channel for a first set of repetitions in the plurality of sets of repetitions in the determined corresponding control channel resource in a first configured BWP; and
receive control information in the control channel for each repetition of the second set of repetitions in the plurality of sets of repetitions in the determined control channel resource in a second configured BWP.

16. The UE of claim 6, wherein the control channel is a PDCCH, the control channel resource is a search space set, and the control channel offset is one of a BWP offset and a search space set offset.

17. The UE of claim 6, wherein the control channel is a physical uplink control channel (PUCCH), the control channel resource is a PUCCH resource, and the control channel offset includes at least one of a BWP offset, a PUCCH resource set offset, and a PUCCH resource offset.

18. The UE of claim 6, wherein:
to determine the corresponding control channel resource in the corresponding BWP for each set of the plurality of sets of repetitions, the at least one processor:
determines a control channel resource for each repetition of a first set of repetitions in a configured control channel resource in an active BWP; and
determines a control channel resource for each repetition of a second set of repetitions based on the configuration of the control channel offset; and
the computer executable instructions cause the apparatus to:
transmit control information in the control channel for a first set of repetitions in the plurality of sets of repetitions in the determined corresponding control channel resource in a first configured BWP; and
transmit control information in the control channel for each repetition of the second set of repetitions in the plurality of sets of repetitions in the determined control channel resource in a second configured BWP.

19. A base station comprising:
at least one non-transitory computer-readable medium having computer executable instructions stored therein;
at least one receiver;
at least one transmitter; and
at least one processor coupled to the at least one non-transitory computer-readable medium, the at least one receiver and the at least one transmitter;
wherein the computer executable instructions cause the apparatus to:
transmit configurations of a plurality of bandwidth parts (BWPs);
transmit a configuration of control channel offset for a control channel; and determine a corresponding control channel resource in a corresponding BWP for each set of a plurality of sets of repetitions of control channels by using at least the configuration of the control channel offset and the configurations of the BWPs.

20. The base station of claim 19, wherein:
to determining the corresponding control channel resource in the corresponding BWP for each set of the plurality of sets of repetitions, the at least one processor:
   determines a control channel resource for each repetition of a first set of repetitions in the configured control channel resource in the active BWP; and
   determines a control channel resource for each repetition of a second set of repetitions based on the configuration of the control channel offset; and
the computer executable instructions cause the apparatus to:
   transmit control information in the control channel for a first set of repetitions in the plurality of sets of repetitions in the determined corresponding control channel resource in a first configured BWP; and
   transmit control information in the control channel for each repetition of the second set of repetitions in the plurality of sets of repetitions in the determined control channel resource in a second configured BWP.

* * * * *